(12) United States Patent
Bloem et al.

(10) Patent No.: US 6,215,488 B1
(45) Date of Patent: *Apr. 10, 2001

(54) METHOD AND SYSTEM FOR DESIGNING A GRAPHICAL USER INTERFACE FOR AN ELECTRONIC CONSUMER PRODUCT

(75) Inventors: Gerrit-Jan Bloem; Frank Anton Morselt, both of Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,698

(22) Filed: Jun. 12, 1998

(30) Foreign Application Priority Data

Jul. 15, 1997 (EP) .................................................. 97202193

(51) Int. Cl.[7] ...................................................... G06F 13/00
(52) U.S. Cl. ............................ 345/334; 345/335; 345/333
(58) Field of Search ................................... 345/334, 335, 345/336, 339, 333, 356

(56) References Cited

U.S. PATENT DOCUMENTS

| 5,404,441 | 4/1995 | Satoyama | ............................. 395/155 |
|---|---|---|---|
| 5,524,244 | * 6/1996 | Robinson et al. | ................... 395/705 |
| 5,818,445 | * 10/1998 | Sanderson et al. | .................. 345/334 |
| 5,850,548 | * 12/1998 | Williams | .............................. 345/961 |
| 5,883,639 | * 3/1999 | Walton et al. | ........................ 345/473 |

OTHER PUBLICATIONS

Laura A. Valaer, "Choosing a User Interface Development Tool", vol. 14, No. 4, 1997.

* cited by examiner

Primary Examiner—Raymond J. Bayerl
Assistant Examiner—Tadesse Hailu
(74) Attorney, Agent, or Firm—Anne E. Barschall

(57) ABSTRACT

A method and system for effectively and efficiently constructing a development environment for graphical user interfaces for an electronic consumer product. The basic aim of the invention tool is to automatically generate an interface in the authoring environment for customer specific target control components. This is done so by automatically creating a host platform control component (in the format of an OCX) from an existing target platform control component (in the format of a C header file). After running the invention once for every control component, a designer can then write on the host, for instance Visual Basic application code that performs calls to properties and methods of these generated control components.

8 Claims, 3 Drawing Sheets

```
float minfreq, maxfreq;
void SetChannelNumber(int channel, float freq);
float GetChannelFreq(int channel);
char* GetChannelName(int channel);
```

METHOD AND SYSTEM FOR DESIGNING A GRAPHICAL USER INTERFACE FOR AN ELECTRONIC CONSUMER PRODUCT

BACKGROUND OF THE INVENTION

The invention relates to a method according to the preamble of claim 1. Present-day consumer products, such as for example television sets, and the like, get implemented with many user features, that must individually as well as collectively be rendered accessible to a user person through an appropriate graphical user interface. Now, a graphical user interface in the first place contains graphical objects that may include items like buttons, sliders, hotspots, and indicators of various kinds such as icons and text. Further elements of such interface are functional objects that link the graphical objects to an associated underlying functionality. The graphical objects are represented by so-called widget components that contain the facilities and restrictions of the underlying display hardware. An example of such widget may have properties like "backgroundcolour", events like "clicked" and methods like "redraw". The functional objects are represented by so-called control components. An example is a tuner component, having properties like "maximumfrequency", events like "channelfound", and methods like "setchannelnumber".

Now for constructing a graphical user interface in an effective and efficient manner, it is necessary to have available a well-defined design environment that provides a true likeness (WYSIWYG) of the eventual imagery on the display of the product. To build such an environment for a particular graphic IC is expensive, and moreover, may be targeted to an uncertain realization. With respect to the target platform, the defining of features of the display hardware is nowadays realized through embedded and callable library software. Such libraries may in time be frequently amended in successive versions of the display hardware in question or in replacement types for that display.

To be able to define the coupling between the two categories of component, the designer of an application should know the application programming interface (API) of the control components. This interface could be defined by various different economic entities in the manufacturing column and may not be uniform in time. Both widget components and control components on the target platform are generally defined in a general purpose language like C that has a relatively low degree of abstraction.

Therefore, implementation of graphical user interfaces directly on the target is time-consuming and costly. Now there exist generic platforms like the PC, that allow the running of various relatively higher abstracted programming environments such as Microsoft Visual Basic that are well suited for creating graphical user interfaces on that platform. Nowadays more and more of those generic development environments are used for constructing graphical user interfaces on specific hardware. In that case communication to the host platform (the PC) of the facilities and restrictions of the target platform is crucial.

SUMMARY TO THE INVENTION

In consequence, amongst other things, it is an object of the present invention to allow the automatic defining of all kinds of control components in the graphical user interface as based on the underlying library software, while recognizing that widget components on a host platform such as a PC, and a target system, such as a television set, may be too wide apart from each other to be convertible automatically. Therefore, in its most extensive version, the following aspects are necessary, although in less complete solutions, a subset of the following may suffice:

Widget components on the host platform representing the widget components of the target, so that the application programmer (designer) will have the facilities and restrictions of the target platform available.

Interfaces of the control components on the host platform representing the control components of the target, so that the application programmer may indicate the link from the graphics to the underlying functionality. Optionally, the application programmer may construct the implementation of the interface, thereby effecting a certain degree of functionality simulation on the host.

A compiler that translates the host application to a target application.

Now therefore, according to one of its aspects the invention is characterized by the items recited in the characterizing part of claim 1.

The invention also relates to a system being arranged for implementing the above method. Further advantageous aspects of the invention are recited in dependent claims.

BRIEF DESCRIPTION OF THE DRAWING

The invention provides a tool to generate the framework of a control OCX (cf. the glossary) from a C library of target control code. In a particular embodiment, the invention should be an integral part of a graphical development environment on a generic platform, such as Visual Basic for the PC. The generated control OCX will generally not perform the control functions, inasmuch as it will be decoupled from the hardware. However it will present the same interface inside the authoring environment as available on the target platform, and thus avoid mismatch after subsequent code generation. Such and further aspects and advantages of the invention will be discussed more in detail along with the disclosure of preferred embodiments hereinafter, and in particular with reference to the appended Figures that show.

VOCABULARY

For better insight into the invention, the following definitions are given:

API
    Application Programming Interface
Component
    A configurable part of the system which has properties, methods and responds to events. Within Visual Basic components are OCX-es.
Container
    An OLE container which may contain OCX-es.
Control component
    A component that controls part of the functionality of a TV or other display.
Event
    A trigger from a user input device or system device, e.g. remote control 'volume up', front panel 'off', channel tuned signal.

Method

A function belonging to an OCX that can be called at runtime by a container application like Visual Basic.

OCX

OLE Control Extension. A self contained plug in, binary software module that can only be used inside an application like Visual Basic. For example, a button or a timer.

OLE

Object Linking and Embedding: Microsoft's component based software technology.

Post Processor

Name commonly used for the target code generator.

Property

A variable belonging to an OCX that can be changed at either design or run time by a container application such as Visual Basic, e.g. a button's colour or icon, a timer's timeout.

Target System

The graphic IC for which authoring is required.

Target widget

A (graphical) component in a form suitable for use on the target system.

Visual Basic

Graphical development environment for the creation of Microsoft Windows applications. Visual Basic may inter alia be used to create OCX-es.

Widget

Window gadget, a component with a representation on screen, e.g. button, slider.

DETAILED DESCRIPTION OF PREFERRED EMBODIMENTS

Figure 1:
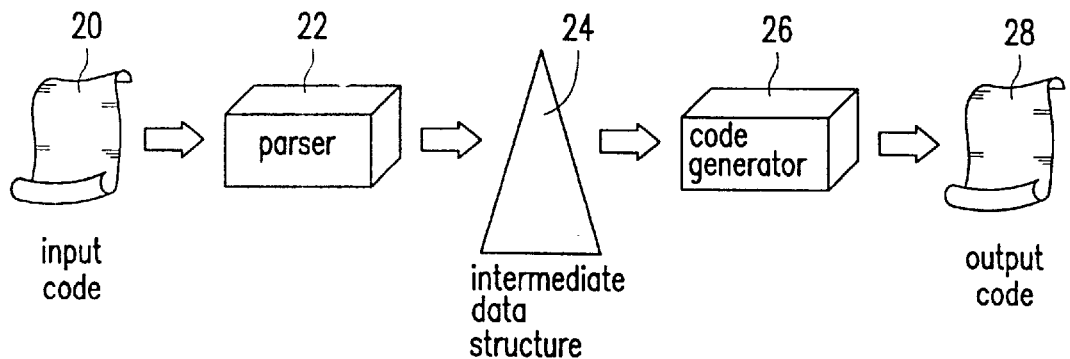
FIG. 1, general architecture of a compiler system.

FIG. 1 shows the general architecture of a compiler system. Item 20 represents the input code that comes as a finite-length string of formatted information items defined according to an appropriate origin syntactic structure. For compiling, the string is first fed to parser subsystem 22, that under execution of various analyzing substeps, divides the string in functional code units, whilst maintaining any pre-existing cross-referencing among the various functional code units as received. This parsing then will create an intermediate data structure symbolized by item 24 that usually is constructed around some notion of hierarchy, and has thus been symbolized by a pyramid-like shape. In subsystem 26, the structure so formed is processed under the constraints of a chosen target syntactic structure, to thereby produce an output code 28 that thereby constitutes a mapping of the original code functionality in another language. By itself, compilers are tools that allow automatic conversion of virtually any program into another computer language, and as a general class, compilers represent common general knowledge.

Figures 2, 4:
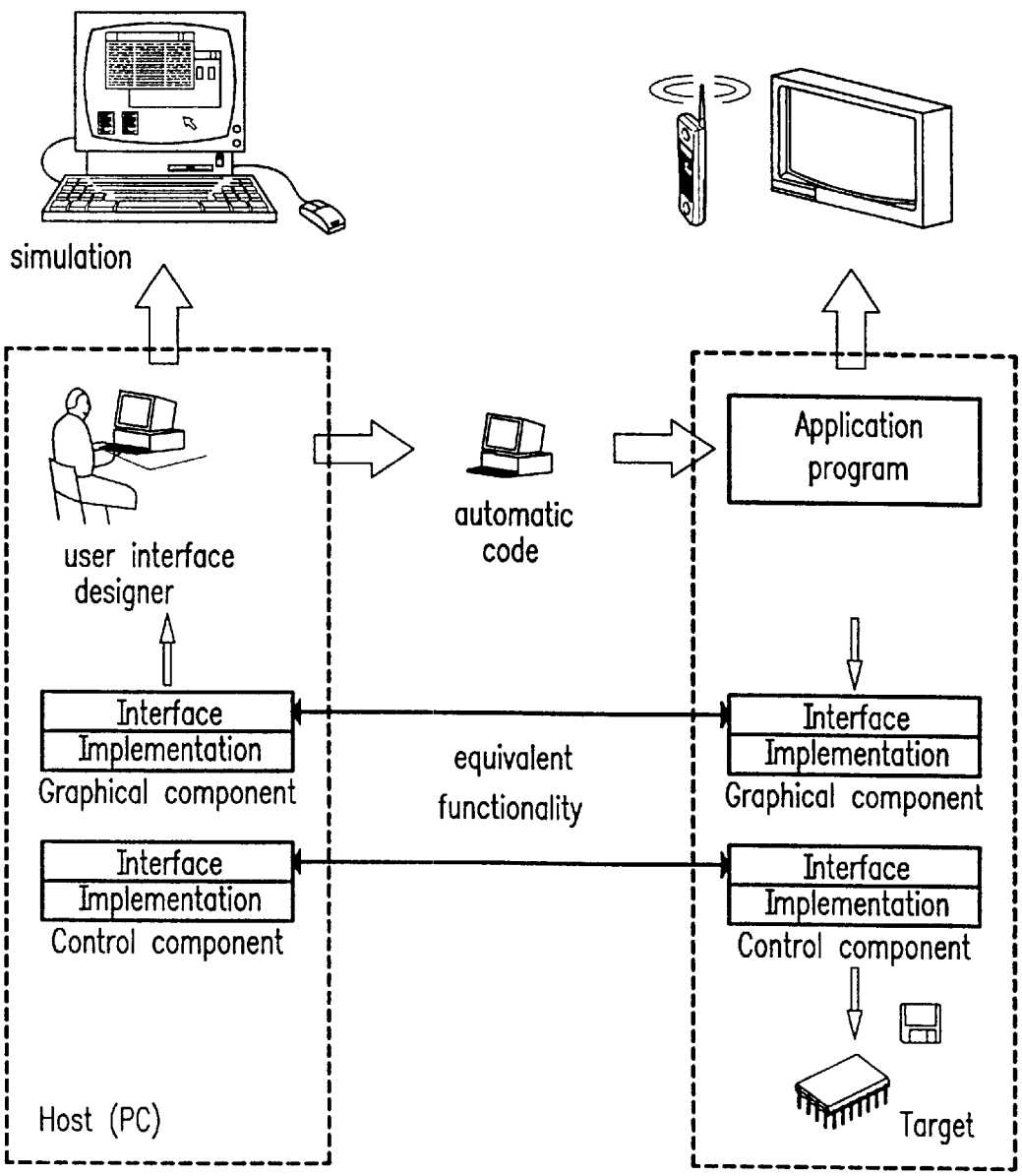
FIG. 2, overview of an authoring environment.
FIG. 4, an exemplary part of the input for the invented compiler.

FIG. 2 gives an overview of the authoring environment from a user's point of view. The host of the authoring system is a PC; the target is a consumer product (for example a TV-set or handheld telephone) which contains one or more ICs for graphic (OSD) and control functionality. Widget and control components are provided, both on the host side as well as on the target side, having the same functionality on the host and target side. The components on the target side are realized as C software libraries. The components on the host side are realized as OCX-es. An application designer uses the supplied host components in order to create and test an application at a high abstraction level. Once the designer is satisfied with a design after simulation on the PC, this design can be processed (translated) automatically to target software, which will then be compiled and linked with the target components. Finally the application can be tested on the target.

Figure 3:
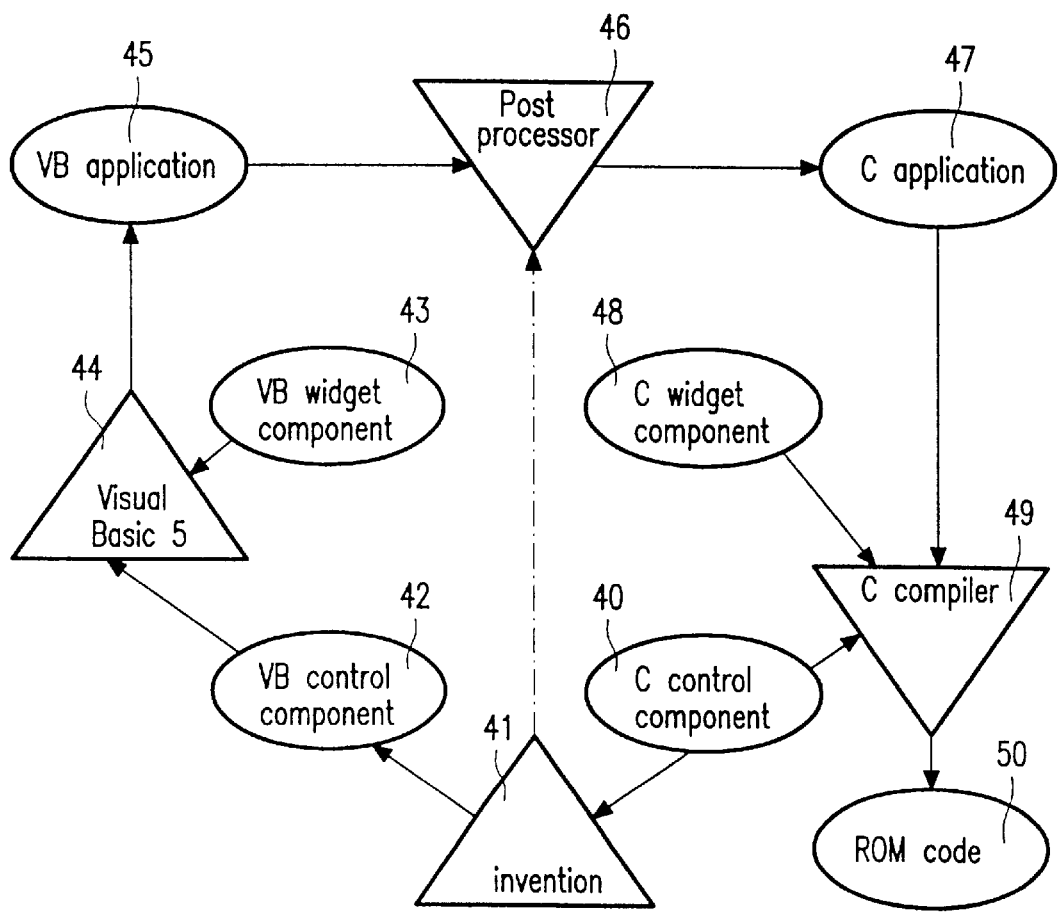
FIG. 3, positioning of the invention in the architecture of an authoring environment.

FIG. 3 shows the invention (block 41) that transforms a Control API in the form of a C header file (block 40) into a Control OCX (block 42), and some other subsystems of the authoring environment. The figure does not cover the total authoring environment system but only those subsystems that are relevant to the invention. Block 44 represents Visual Basic version 5 that forms the base of the authoring environment. In Visual Basic the designer can use two types of OCX'es to create an application: the Widget OCX'es (block 43) for the graphical part of the user interface of the application and the Control OCX'es (block 42) to control the hardware (for example the TV). Block 46 represents the Post Processor, a compiler that translates the application (block 45) that is designed in Visual Basic into a C application (block 47). The Post Processor creates this application by translating all instances of Widget and Control OCX'es with their properties and Visual Basic code to C code. Finally a general C compiler (block 49) may be used to compile the C program to ROM code (block 50).

FIG. 4 illustrates an exemplary part of the compiler input. The input is a C header file containing variables and function declarations (block 48 of FIG. 2). The header file specifies how to set or read the state of a piece of hardware by a C program. In this example there exists a header file that specifies how to control a tuner. For example, you can set the frequency range, used by the tuner when it is searching for valid programs, by setting the minfreq and maxfreq variables to a certain value, and assigning a channel number to a frequency by calling the SetChannelNumber function.

Figure 5A:
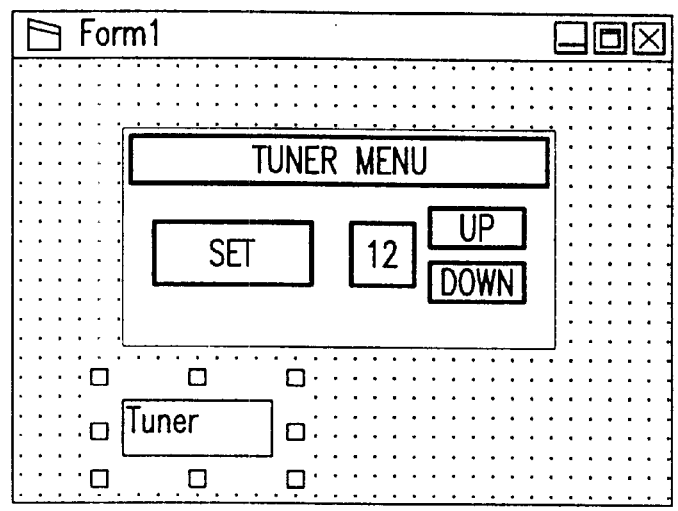
FIGS. 5a and 5b, an exemplary part of the use of the output of the invented compiler in an application designed on the host.
Figure 5B:
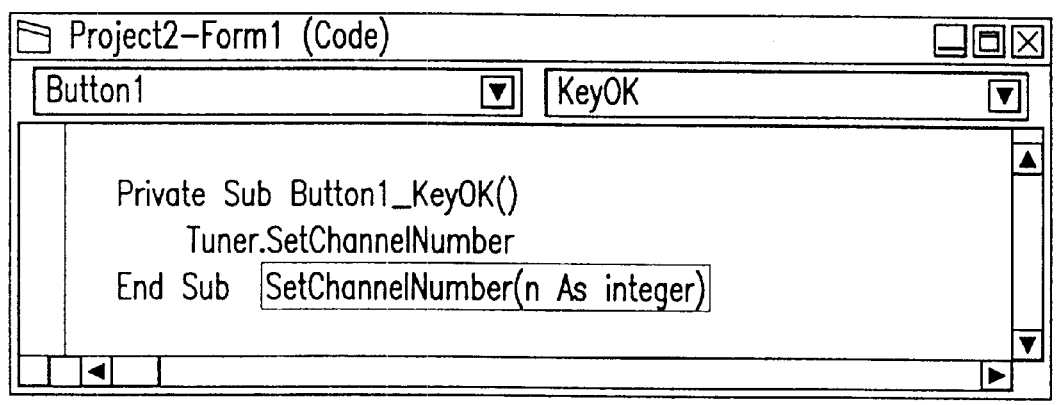

FIGS. 5a, 5b, in correspondence with FIG. 4, illustrate an example of how to use the output of the invented compiler (block 41 in FIG. 3) in the authoring environment. The output (the generated Control OCX, block 42 in FIG. 3) is the white square with the name of the header file on it ("tuner" in this case). You can use this object in Visual Basic at design-time in the same way you use the objects to construct a graphical user interface (the widget OCX'es, block 43 in FIG. 3). During the design, the location, orientation, size, shape, caption, name, colour and various other attributes of a particular control may be amended, by keying, dragging and other control mechanisms.

In FIG. 5a, the tuner Control OCX is placed together with some Widget OCX'es representing the graphical user interface of the application. Since the variable declarations of the tuner header file are translated to properties of the tuner Control OCX and the function declarations of the tuner header file are translated to methods of the tuner Control OCX, it is possible to simulate the manipulation of the concerned piece of hardware (the tuner in this example).

In FIG. 5b this is illustrated by a piece of code that is written by the application designer in the code window of Visual Basic. In this particular case, the SetChannelNumber function will be called if the 'Buttonl control' sends the event that it has been pressed with the OK-key of the remote control. Due to the fact that the tuner is not part of the graphical part of the designed application, it will be invisible when the application is executed in Visual Basic run-time mode. Further, according to the Visual Basic syntax, various widget components have been specified in the Figure, that respectively represents the tuner menu, the set definition, the specifying of a quantity, here the channel number "12", the incrementing and decrementing buttons, and one control component, the newly introduced "tuner" component.

The invention produces a Visual Basic control file (.ctl) and project file (.vbp) which together form a Visual Basic project and can be compiled into a control OCX or used as a Visual Basic subproject.

The invention translates C code constructs into higher level programming language constructs. In general, such higher level language has less detailed constructs available, for instance C is strongly typed and allows for pointer arithmetic, while Visual Basic language is/does not. Basically, the translation from C to Visual Basic is a non-injective mapping function and information is lost. The invention should provide this missing information to the Post Processor that will re-generate this information. One possible solution is to let the invention generate a conversion table that the Post Processor can use.

When the invention has generated the control OCX, it will become available for the designer in the standard Visual Basic toolbox indicated by a standard icon.

All control components are indicated by the same icon, however they can be distinguished by moving the cursor on top of the icon and reading the name of the component. Every control component bears the same name as its original C header file from which it was created. When an instance of such a control component is placed on a VB form, it is visualized on this form, for instance by a white rectangle showing its name in the left top corner (see FIG. 5a).

In simulation mode, the application code can read/write properties, call methods, and react on events from the generated control component. Initially, these actions have no effect, since the bodies on the methods in the generated components are empty (they are just stubs). However, it is possible to manually write Visual Basic code in the bodies so that it has some functionality in simulation mode. An example of such functionality could be a simulation panel that shows all current (emulated) hardware parameter values. This way, the designer will get some feedback on the control components in his design. Obviously, you can not test the control functionality itself, because it is decoupled from the target hardware.

The method described herein may to a large part be applicable to another type of application than graphical user interfaces. The principle is that a part of the features translates immediately from host to target, whereas for others, the host has only dummy functionality, whereas the target platform is fully operative. The automatic compilation again ensures the immediate transferability.

What is claimed is:

1. A system for developing a graphical user interface comprising:

a. at least one target device comprising a target processor for maintaining an arrangement of graphical and control components, using a first computer language;

b. at east one host device comprising a host processor for maintaining a duplicate arrangement of duplicate graphical and control components, using a second computer language, different from the first computer language; and c. means for linking the components and duplicate components and keeping them fully equivalent, the linking means comprising:

i. a compiler for compiling first component specification code from the first environment to the second computer language; and ii. a procedure for generating second component specification code conversion from the second environment to the first computer language, wherein the procedure for generating adds information lost during processing on the host.

2. A system as claimed in claim 1, whilst using a C header file for a interface of a control components in a software library.

3. The system of claim 1, wherein the first computer language is C and the second computer language is visual basic.

4. The system of claim 1, wherein the target device is a screen-based product.

5. A computer method for establishing a development environment for an application for a target processor, using a host processor, the method comprising:

maintaining a development platform on the host processor, using a first computer language;

maintaining a runtime platform on the target processor, using a second computer language, different from the first computer language;

coordinating the platforms so that application functions on both remain fully equivalent, including:

automatically compiling first code sets from the target processor to the host processor; and automatically converting second code sets from the host processor to the target processor, wherein the automatically converting comprises adding information lost during processing on the host.

6. The method of claim 5, wherein the target processor is in a consumer product.

7. The method of claim 5, wherein at least one of the first and second conmputer language is C.

8. The method of claim 5, wherein at least one of the first and second computer language is Visual Basic.

* * * * *